United States Patent [19]

Kim

[11] Patent Number: 5,600,547
[45] Date of Patent: Feb. 4, 1997

[54] INVERTER CIRCUIT UTILIZING A FREQUENCY SYNCHRONIZATION DEVICE

[75] Inventor: Joon H. Kim, Kyungki-do, Rep. of Korea

[73] Assignee: Samsung Electro-Mechanics Co., Ltd., Kyungki-do, Rep. of Korea

[21] Appl. No.: 575,192

[22] Filed: Dec. 20, 1995

[30] Foreign Application Priority Data

Dec. 21, 1994 [KR] Rep. of Korea .................. U94 34795

[51] Int. Cl.[6] .............................. H02M 3/335; H02M 7/00
[52] U.S. Cl. .............................................. 363/22; 363/124
[58] Field of Search ........................ 363/22, 23, 124, 363/25, 26, 97; 323/282, 283, 284

[56] References Cited

U.S. PATENT DOCUMENTS

| | | | |
|---|---|---|---|
| 3,818,306 | 6/1974 | Marini | 321/2 |
| 4,316,136 | 2/1982 | Saxarra et al. | 323/282 |
| 4,472,672 | 9/1984 | Pacholok | 320/21 |
| 4,580,090 | 4/1986 | Bailey et al. | 323/303 |
| 4,811,184 | 3/1989 | Koninsky et al. | 363/17 |
| 5,408,404 | 4/1995 | Mitchell | 363/71 |

*Primary Examiner*—Peter S. Wong
*Assistant Examiner*—Bao Q. Vu
*Attorney, Agent, or Firm*—Lowe, Price, LeBlanc & Becker

[57] ABSTRACT

An inverter circuit that can provide a stable AC power supply by synchronizing the switching operations of a DC-to-DC converter and a DC-to-AC converter which constitute the inverter circuit with each other.

The inverter circuit includes an error amplifier for comparing a feedback control voltage from the DC-to-AC converter with a reference voltage and amplifying the resultant voltage of comparison, a frequency synchronizing section for providing a sawtooth voltage synchronized with the frequency of a ripple voltage occurring at an output terminal of the DC-to-DC converter due to the switching operation of the DC-to-AC converter, and a comparator for comparing the sawtooth voltage with the output voltage of the error amplifier, and providing a switching control signal to the DC-to-DC converter as result of comparison.

2 Claims, 3 Drawing Sheets

INVERTER CIRCUIT UTILIZING A FREQUENCY SYNCHRONIZATION DEVICE

BACKGROUND OF THE INVENTION

1. Field of the Invention

The present invention relates to an inverter circuit, and more particularly to an inverter circuit that can minimize the distortion of an AC supply voltage output converted from an input DC power supply and provide a stabilized AC supply voltage.

2. Description of the Prior Art

An inverter circuit is a kind of device that converts a DC power supply into an AC power supply. The inverter circuit is typically provided in an electronic appliance such as a notebook computer, a portable television receiver, etc., and provides an AC power supply to an AC load by converting a DC power supply from a battery or the like into the AC power supply. For instance, the inverter circuit may be used for providing the AC power supply to a cold cathode florescent tube which is equipped in a notebook computer having a large liquid crystal display (LCD) screen.

A conventional inverter circuit includes a DC-to-DC converter for converting an input DC power supply into another DC supply voltage suitable to be converted into a desired AC power supply, and a DC-to-AC converter, coupled to the DC-to-DC converter, for converting the DC supply voltage into the AC power supply voltage.

FIG. 1 is a schematic circuit diagram of a conventional inverter circuit. Referring to FIG. 1, the conventional inverter circuit is provided with a DC-to-DC converter 10 for converting an input DC supply voltage into another DC supply voltage of a predetermined level, a DC-to-AC converter 30 for converting the DC supply voltage outputted from the DC-to-DC converter 10 into an AC supply voltage to provide the converted AC supply voltage to load RL, and a feedback loop F/B for detecting the voltage outputted from the DC-to-AC converter and feeding the detected voltage back to the DC-to-DC converter.

The DC-to-DC converter 10 comprises a transistor Q1 for switching the DC supply voltage inputted through an input terminal Vin, a pulse width modulation integrated circuit (PWM IC) 11 which provides a PWM pulse signal for controlling the on/off time of the transistor Q1 thereto, a diode D1 for rectifying the output voltage of the transistor Q1, and a coil L1 for smoothing the output voltage of the diode D1.

The DC-to-AC converter 30 comprises a transformer T1 having primary windings for receiving the DC supply voltage outputted from the DC-to-DC converter 10 and a secondary winding for developing the AC supply voltage, transistors Q2 and Q3, coupled to the primary windings of the transformer T1, for alternately controlling the input timing of the DC supply voltage being inputted to the transformer T1, a resistor R1 for controlling a current flow to the transistors Q2 and Q3, a capacitor C1 for resonance, and a capacitor C2 for filtering the DC component of the current induced in the secondary winding of the transformer T1.

The feedback loop F/B is composed of a resistor Rs, coupled to the output of the DC-to-AC converter 30, for sensing the output current of the DC-to-AC converter 30, a diode D2 and a capacitor C3 for rectifying and smoothing the difference voltage between both ends of the resistor Rs and feeding the rectified and smoothed voltage back to the PWM IC 11 in the DC-to-DC converter 10.

The operation of the conventional inverter circuit as constructed above will now be explained.

Referring to FIG. 1, the DC supply voltage inputted through the input terminal Vin is applied to the emitter of the transistor Q1. The PWM pulse signal produced from the PWM IC 11 is applied to the base of the transistor Q1. Accordingly, the transistor Q1 is turned on in high level periods of the PWM IC 11. The output voltage of the transistor is rectified and smoothed by the diode D1 and the coil L1, and the rectified and smoothed DC voltage is supplied to the DC-to-AC converter 30.

The width of the PWM pulse signal, which is applied from the PWM IC 11 to the base of the transistor Q1 to control the duty cycle of the transistor Q1, may be adjusted manually by a user or automatically adjusted in accordance with the output voltage level of the DC-to-AC converter 30 detected by the feedback loop F/B.

The DC voltage converted by the DC-to-DC converter 10 is applied to the base of the transistor Q2 through the resistor R1 in the DC-to-AC converter 30 to turn on the transistor Q2. When a predetermined time elapses after the transistor Q2 is turned on, the transistor Q2 is turned off due to the current supply capability limitations of the transformer's T1 primary winding. If the transistor Q2 is turned off, the base of the transistor Q3 becomes high, resulting in the transistor Q3 being turned-on. The on/off operation of the transistors Q2 and Q3 is repeated alternately.

Specifically, a positive sine wave voltage is developed in the secondary winding of the transformer T1 during a period when the transistor Q2 is turned on and the transistor Q3 is turned off. In contrast, a negative sine wave voltage is developed in the secondary winding of the transformer T1 during a period when the transistor Q1 is turned on and the transistor Q2 is turned off. As a result, a complete sine wave is developed in the secondary winding of the transformer T1 by the alternate on/off operation of the transistors Q2 and Q3.

The sine wave voltage is then supplied to the AC load RL through the capacitor C2. The load RL may be a cold cathode florescent tube which serves as a back lighting lamp in a notebook computer.

As the AC supply voltage is supplied from the DC-to-AC converter 30 to the load RL, the output current of the DC-to-AC converter 30 is sensed by the sensing resistor Rs in the form of a voltage. The voltage sensed by the sensing resistor Rs is rectified and smoothed by the diode D2 and the capacitor C3, respectively, and is fedback to the PWM IC 11 in the DC-to-DC converter 10. The PWM IC 11 controls the duty cycle of the PWM pulse signal outputted therefrom in accordance with the feedback voltage from the feedback loop F/B to control the on/off time of the transistor Q1.

However, the conventional inverter circuit as described above has the drawback in that switching operations of the DC-to-DC converter 10 and the DC-to-AC converter 30 are not synchronized with each other since the switching operation of the DC-to-DC converter 10 is performed by the PWM pulse signal provided from the PWM IC 11, while that of the DC-to-AC converter 30 is performed by the frequency which is determined by the capacitance of the capacitor C1 and the inductance of the primary winding of the transformer T1. This causes the distortion of the AC output waveform to be supplied to the load, such as the back lighting lamp, and causes the AC output voltage to become unstable, resulting in that the lamp cannot be kept in a uniform luminescent degree and the life time of the lamp is shortened.

SUMMARY OF THE INVENTION

The present invention is directed to solving the above-mentioned problems involved in the prior art. It is an object of the present invention to provide an inverter circuit which can provide a stable AC power supply by synchronizing the switching operations of the DC-to-DC converter and the DC-to-AC converter which constitute the inverter circuit with each other.

It is another object of the present invention to provide an inverter circuit which can provide a PWM pulse signal to the DC-to-DC converter with its simple construction, not using an expensive PWM IC, and thereby reducing the manufacturing cost of the inverter circuit.

In order to achieve the above objects, the present invention provides an inverter circuit which comprises:

a DC-to-DC converter for converting an input power supply voltage into another DC supply voltage of a predetermined voltage level;

a DC-to-AC converter for converting said DC power supply from said DC-to-DC converter into an AC power supply;

feedback means for detecting said AC power supply current from said DC-to-AC converter as a voltage and feeding the detected voltage back to said DC-to-DC converter as a feedback control signal;

voltage difference detection means for detecting the voltage difference between the detected voltage and a reference voltage, and amplifying the detected voltage difference with a predetermined amplification factor;

frequency synchronizing means, coupled between said DC-to-DC converter and said DC-to-AC converter, for providing a sawtooth voltage synchronized with a frequency of a ripple voltage which is generated at an output terminal of said DC-to-DC converter due to a switching operation of said DC-to-AC converter; and voltage comparing means for comparing said sawtooth voltage provided from said frequency synchronizing means with an output voltage of said voltage difference detection means, and providing a switching control signal to said DC-to-DC converter as a result of comparison.

Preferably, the frequency synchronizing means according to the present invention comprises:

a capacitor and two resistors for performing charge/discharge operation with respect to said input DC supply voltage; and a diode for providing a current discharged from said capacitor to said output terminal of said DC-to-DC converter.

BRIEF DESCRIPTION OF THE DRAWINGS

The above objects and other features of the present invention will become more apparent by describing the preferred embodiment thereof with reference to the accompanying drawings, in which.

DETAILED DESCRIPTION OF THE PREFERRED EMBODIMENT

Figure 1:
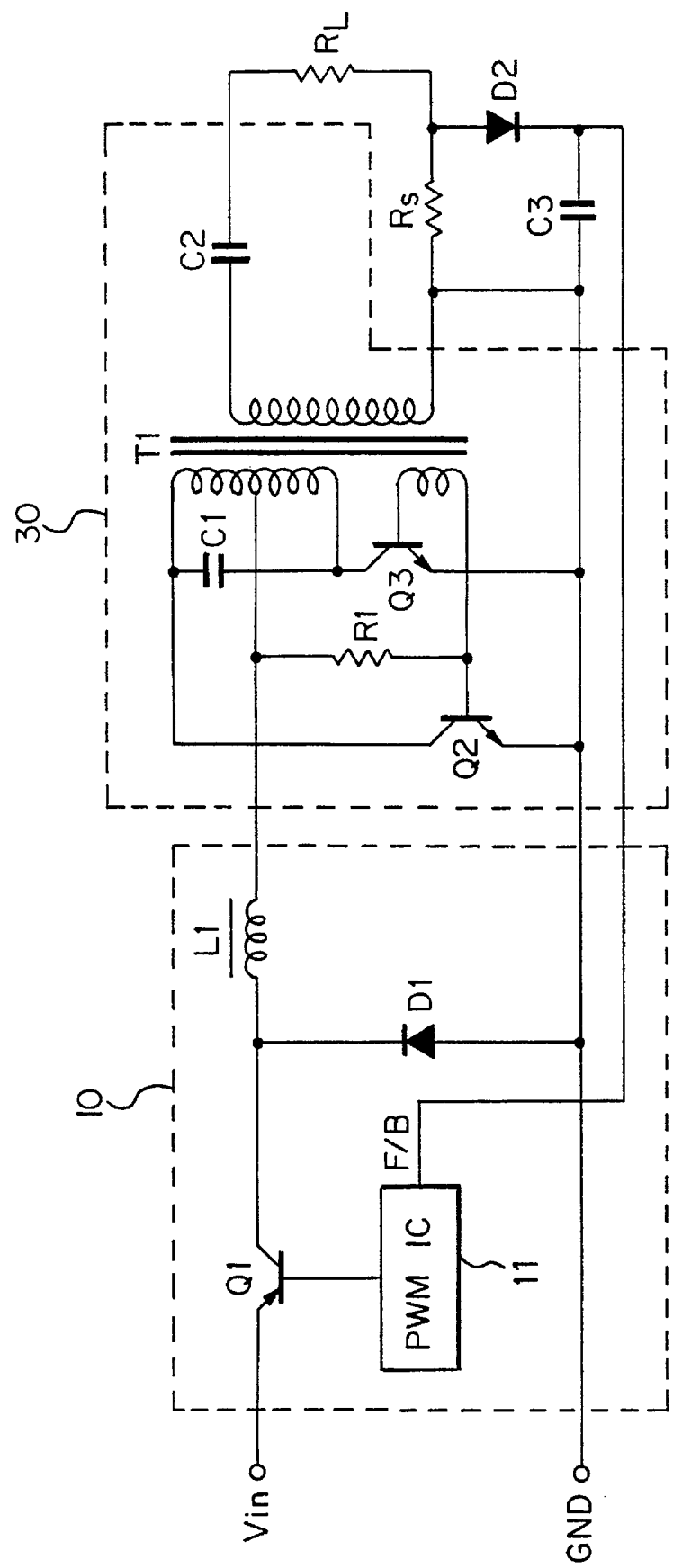
FIG. 1 is a schematic circuit diagram of a conventional inverter circuit.
Figure 2:
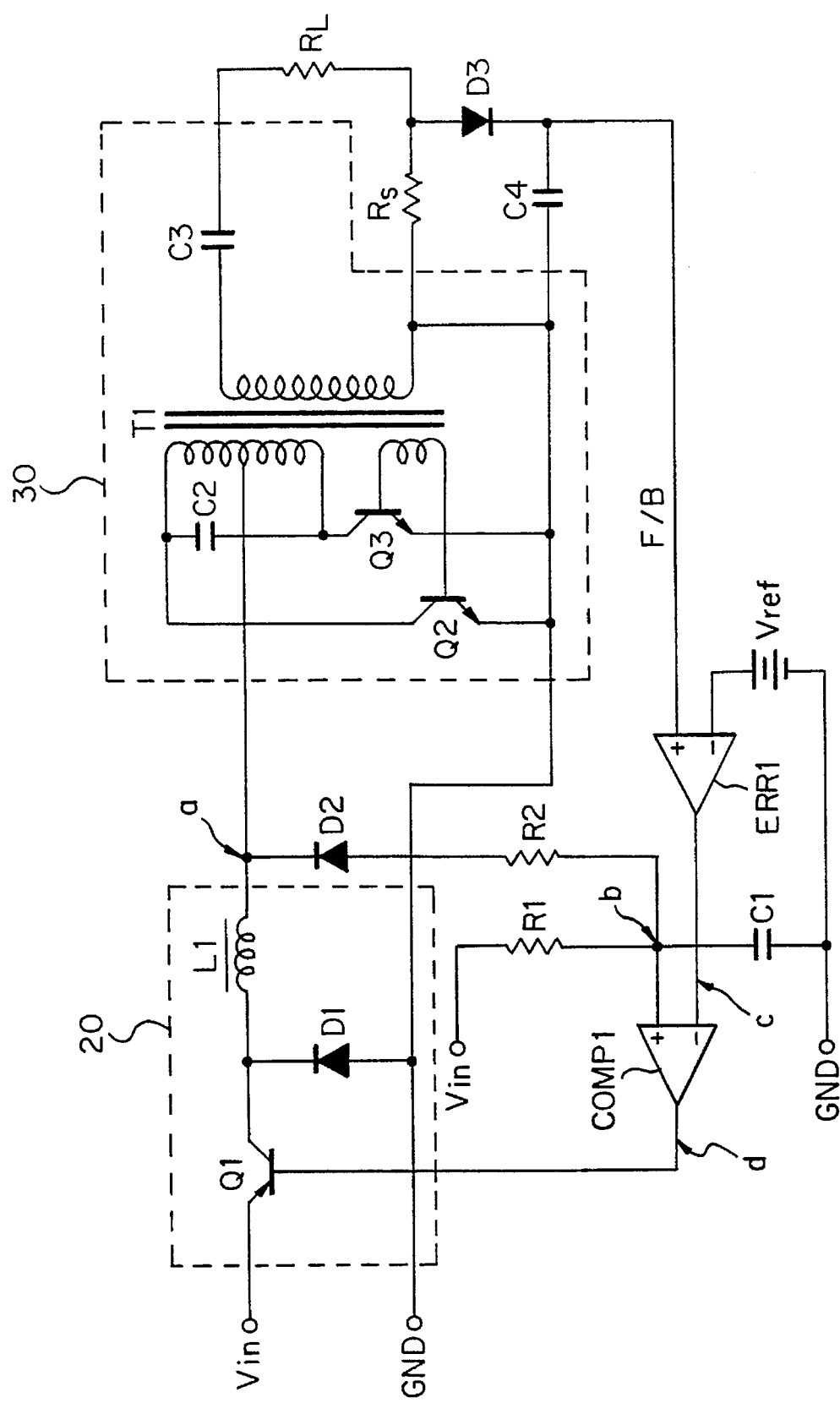
FIG. 2 is a schematic circuit diagram of an inverter circuit according to an embodiment of the present invention.

Referring to FIG. 2, an inverter circuit embodying the present invention is schematically illustrated. In FIG. 1, the present inverter circuit includes a DC-to-DC converter 20 for converting a DC power supply inputted through an input terminal Vin into another DC power supply of a predetermined voltage level, a DC-to-AC converter 30 for converting the DC power supply converted by the DC-to-DC converter 20 into an AC power supply to provide the converted AC supply voltage to a load RL, and a feedback loop F/B for detecting the output current of the DC-to-AC converter 30 and feeding the detected current back to the DC-to-DC converter 30.

The DC-to-DC converter 20 includes a switching transistor Q1 for switching the DC power supply inputted through an input terminal Vin, a diode D1 and a coil L1, connected to the collector of the transistor Q1, for rectifying and smoothing the output of the transistor Q1.

An error amplifier ERR1, which is a voltage difference detection device, detects the voltage difference between a rectified and smoothed voltage of a feedback loop F/B and a reference voltage Vref, and amplifies the difference voltage with a predetermined amplification factor to provide the amplified voltage to an inverting terminal of a comparator COMP1.

A frequency synchronizing device is composed of resistors R1 and R2, a capacitor C1 for performing charge/discharge operation with respect to the input DC supply voltage, and a diode D2 for providing the current discharged from the capacitor C1 to the output terminal of the DC-to-DC converter 20. The frequency terminal of the device is connected to the output terminal of the DC-to-DC converter 20, and provides a sawtooth voltage synchronized with the frequency of a ripple voltage which occurs at the output terminal of the DC-to-DC converter due to the switching operation of the DC-to-AC converter 30.

The comparator COMP1 which is a voltage comparing means compares the sawtooth voltage from the frequency synchronizing device with the output voltage of the error amplifier ERR1.

The DC-to-AC converter 30 is provided with a transformer T1 having primary windings for performing switching operation with respect to the DC supply voltage from the DC-to-DC converter 20 and a secondary winding for developing the AC supply voltage, transistors Q2 and Q3, which are coupled to the primary windings of the transformer T1, for alternately controlling the input timing of the DC supply voltage being inputted to the transformer T1, and a capacitor C3 for filtering the DC component of the AC supply voltage to be supplied to the load RL.

The feedback loop F/B is composed of a sensing resistor Rs, connected between the secondary winding of the transformer T1 and the load RL, for sensing the output current of the DC-to-AC converter 30, a diode D3 for rectifying the difference voltage between both ends of the sensing resistor Rs, and a capacitor C4 for smoothing the rectified voltage through the diode D3 to provide the smoothed DC voltage to the error amplifier ERR1.

The operation of the inverter circuit according to the present invention as constructed above will now be explained in detail.

Referring to FIG. 2, the DC power supply inputted through the input terminal Vin is supplied to the emitter of the transistor Q1. Thus, the transistor Q1 is turned on/off in accordance with the switching control signal (i.e., the PWM pulse signal) which is applied to the base of the transistor Q1. The output voltage of the transistor Q1 is rectified and smoothed by the diode D1 and the supplied to the DC-to-AC converter 30.

Figure 3:
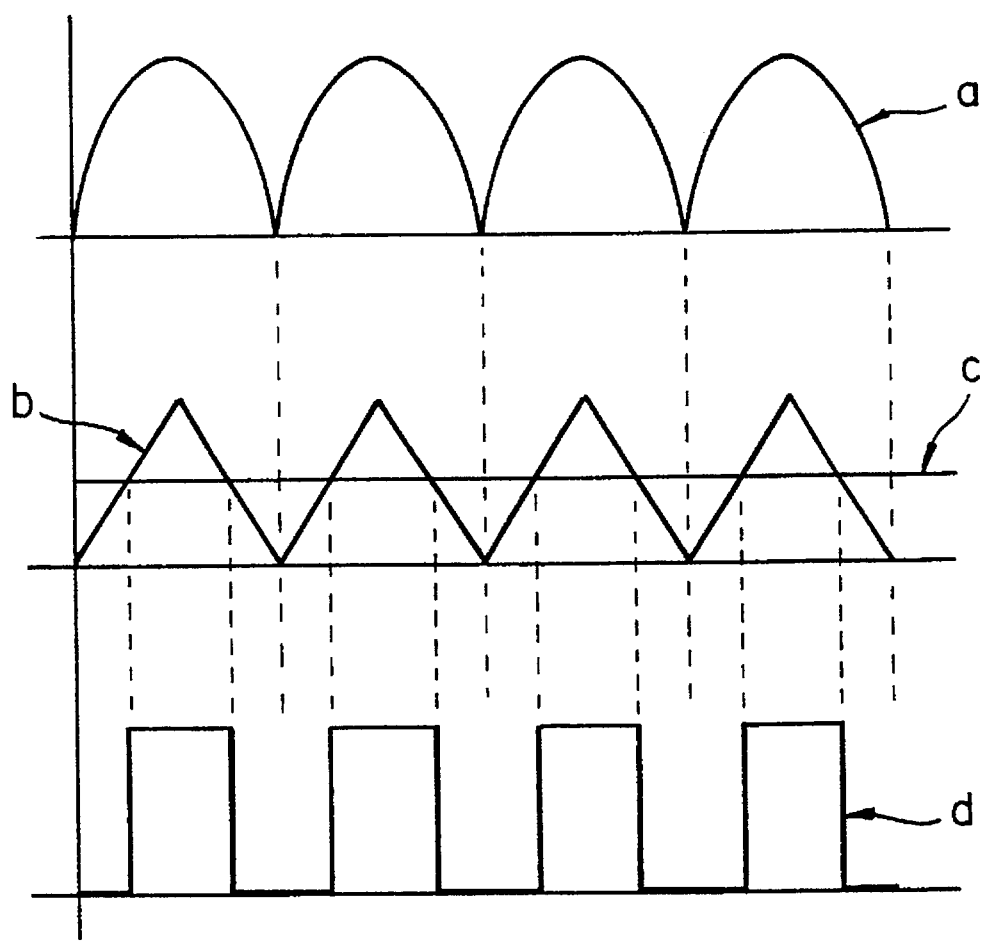
FIGS. 3A to 3C are waveform diagrams illustrating voltage waveforms appearing at various points of FIG. 2.

The DC supply voltage from the DC-to-DC converter 20 is applied to the primary windings of the transformer T1 to alternately turn on/off the transistors Q2 and Q3. The alternate on/off operation voltage as shown in FIG. 3A to be generated at point "a", i.e., at the output terminal of the DC-to-DC converter 20.

At the same time, the capacitor C1 is charged by the input DC supply voltage through the resistor R1, and then discharged in compliance with the ripple voltage generated at point "a". The discharged current flows to point "a" through the resistor R2 and the diode D2. As a result, a sawtooth voltage which is synchronized with the frequency of the ripple voltage in FIG. 3A is produced at point "b" as shown in FIG. 3B. The time constant of the capacitor C1 and the resistor R1 or R2 is properly determined to shape the accurate sawtooth waveform to be produced at point "b". The sawtooth voltage is then supplied to a non-inverting terminal of the comparator COMP1.

The comparator COMP1 compares the sawtooth voltage produced at point "b" with the voltage at point "c", i.e., the output voltage of the error amplifier ERR1. As a result of comparison, the comparator COMP1 outputs a pulse signal as shown in FIG. 3C to the switching transistor Q1 as a switching control signal.

The width of the pulse signal at point "d" is varied in accordance with the voltage at point "c" which is outputted from the error amplifier ERR1 to control the duty cycle of the switching transistor Q1.

The transistors Q2 and Q3 in the DC-to-AC converter 30 are alternately turned on/off in accordance with the DC supply voltage provided from the DC-to-DC converter 20 to the primary winding of the transformer T1.

Specifically, the transistor Q2 is first turned on by the DC supply voltage supplied to the primary winding of the transformer T1. Thereafter, the transistor Q2 is turned off due to the limitations of current supply capability of the primary winding of the transformer T1, causing the base of the transistor Q3 to become high-leveled. Thus, the transistor Q3 is turned on. Consequently, the on/off operation of the transistors Q2 and Q3 is repeated alternately.

As the transistors Q2 and Q3 are turned on/off alternately, a complete sine wave voltage is developed in the secondary winding of the transformer. The sine wave voltage is then supplied to the load RL such as the back lighting lamp through the capacitor C3 as the AC supply voltage.

The voltage sensed between the both ends of the sensing resistor Rs is rectified and smoothed by the diode. A smoothed DC voltage is fed back to the non-inverting input amplifier ERR1, which amplifies the voltage difference between the detected DC voltage and the reference voltage Vref to provide the amplified difference voltage to the inverting terminal of the comparator COMP1. The reference voltage Vref may be set using a shunt regulator.

The comparator COMP1 compares the sawtooth voltage from the frequency synchronizing device with the output voltage of the error amplifier ERR1, the outputs the pulse signal as shown in FIG. 3C to the base of the switching transistor Q1. Accordingly, the switching operation of the transistor Q1 is synchronized with the frequency of the ripple voltage which is generated at point "a" caused by the switching operation of the transistors Q2 and Q3. Consequently, the switching operations of the DC-to-DC converter 20 and the DC-to-AC converter 30 are synchronized with each other.

From the foregoing, it will be apparent that the present inverter circuit provides the advantages that it can provide a stable AC supply voltage with the distortion of the AC supply voltage prevented since the switching operations of the DC-to-DC converter and the DC-to-AC converter are synchronized with each other. Further, it can provide a PWM pulse signal with a simple construction, not employing an expensive PWM IC.

While the present invention has been described and illustrated herein with reference to the preferred embodiment thereof, it will be understood by those skilled in the art that various changes in form and details may be made therein without departing from the spirit and scope of the invention.

What is claimed is:

1. An inverter circuit comprising:

a DC-to-DC converter for converting an input DC power supply into another DC power supply of a predetermined voltage level;

a DC-to-AC converter for converting said DC power supply from said DC-to-DC converter into an AC power supply;

feedback means for detecting said AC power supply current from said DC-to-AC converter as a voltage and feeding the detected voltage back to said DC-to-DC converter as a feedback control signal;

voltage difference detection means for detecting the voltage difference between the detected voltage and a reference voltage, and amplifying the detected voltage difference with a predetermined amplification factor;

frequency synchronizing means, coupled between said DC-to-DC converter and said DC-to-AC converter, for providing a sawtooth voltage synchronized with a frequency of a ripple voltage which is generated at an output terminal of said DC-to-DC converter due to a switching operation of said DC-to-AC converter; and voltage comparing means for comparing said sawtooth voltage provided from said frequency synchronizing means with an output voltage of said voltage difference detection means, and providing a switching control signal to said DC-to-DC converter as a result of comparison.

2. An inverter circuit as claimed in claim 1, wherein said frequency synchronizing means comprises:

a capacitor and two resistors for performing charge/discharge operation with respect to said input DC supply voltage; and a diode for providing a current discharged from said capacitor to said output terminal of said DC-to-DC converter.

* * * * *